Oct. 10, 1933.    F. F. WELLER    1,929,572
AUTOMOBILE JACK
Filed April 2, 1932    2 Sheets-Sheet 1
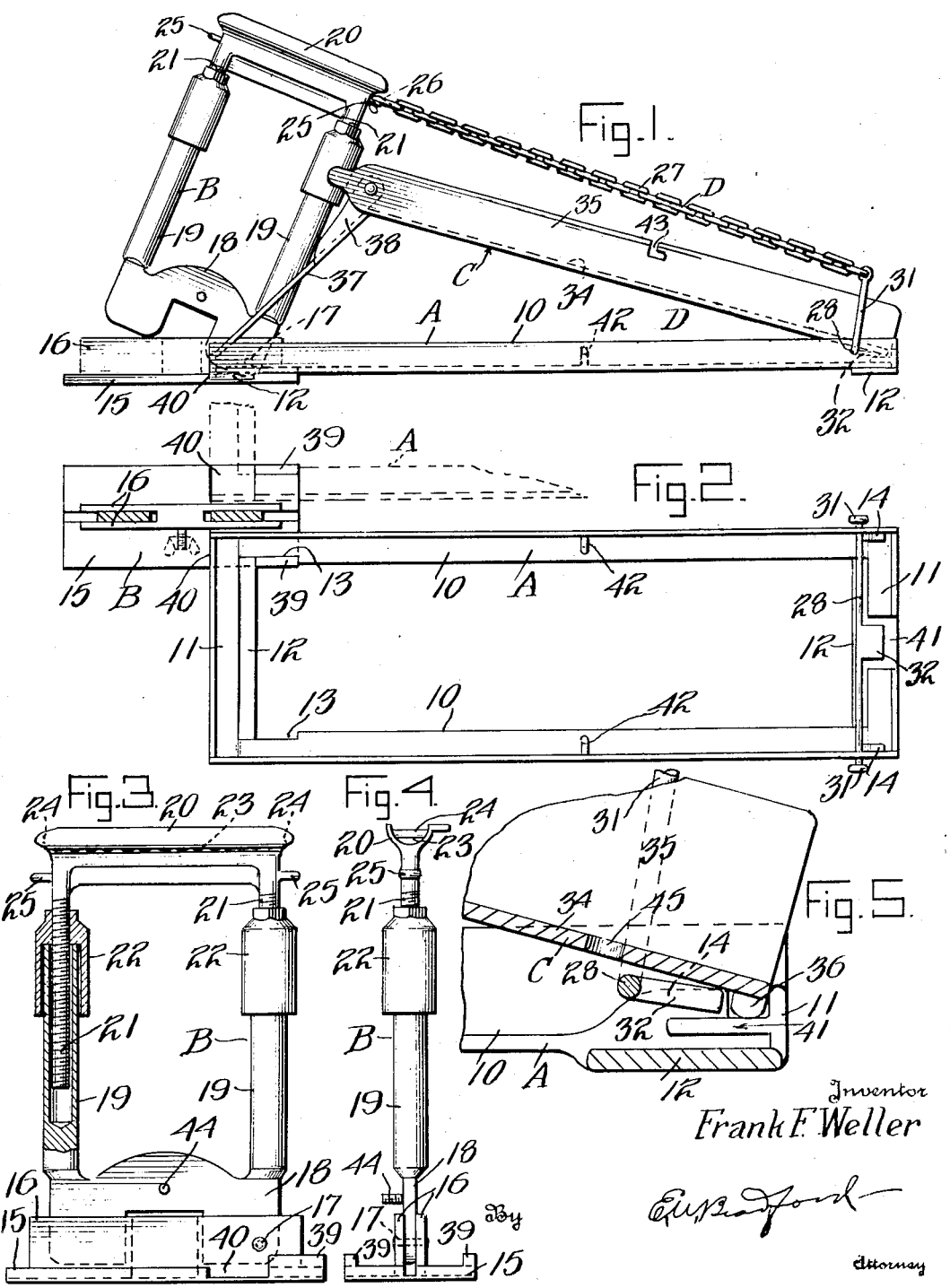

Oct. 10, 1933.    F. F. WELLER    1,929,572
AUTOMOBILE JACK
Filed April 2, 1932    2 Sheets-Sheet 2
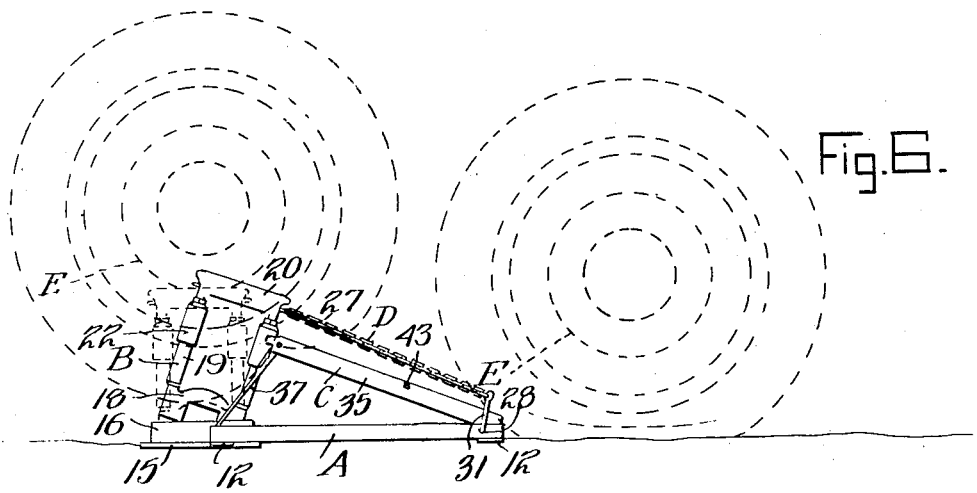
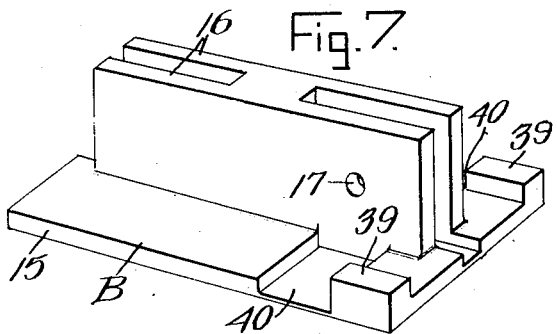
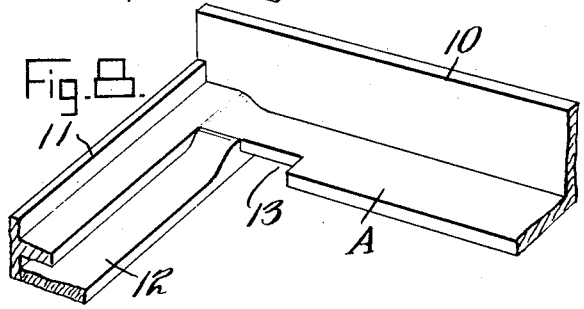
Inventor
Frank F. Weller
By E. W. Bradford
Attorney Patented Oct. 10, 1933

1,929,572

UNITED STATES PATENT OFFICE 1,929,572

AUTOMOBILE JACK

Frank F. Weller, Jennings, La.

Application April 2, 1932. Serial No. 602,791

11 Claims. (Cl. 254—88)

My invention relates to automobile jacks and it is an object of the invention to provide a device of this character which is simple, inexpensive and durable in construction, which may be easily and quickly operated to raise or lower the wheel of an automobile or other vehicle with little manual effort on the part of the operator; all as will be hereinafter more particularly described and claimed.

Referring to the accompanying drawings, which are made a part hereof and on which similar reference characters indicate similar parts, Figure 1 is a side elevation of the complete device, Figure 2, a top plan view of a portion thereof, Figure 3, an elevation partly in section of the wheel support, Figure 4, an end view of the wheel support, Figure 5, an enlarged detail section of the meeting ends of the inclined surface and the frame, Figure 6, a diagrammatic view showing the position of the jack before and after receiving the wheel, and Figures 7 and 8 are detail views of the base of the support and a corner of the frame showing their interlocking connection.

Referring to the drawings my invention comprises basically four major parts, namely, a rectangular frame A, a support B, an inclined track C and a chain brace D. When assembled, one corner of the frame A is locked to the base of the support B, the chain brace D is secured to a camshaft in the frame A and to the support B and the track C is secured in the frame A, as illustrated, forming an inclined track for the wheel.

The frame A is composed of angle iron side members 10 and T-iron end members 11. Beneath each end member 11 is welded a flat strip 12. Notches 13 are formed in the members 10 adjacent one end thereof and at the opposite ends upstanding lugs 14 are provided to form a socket between said lugs and the corresponding member 11 for a purpose to be explained later.

The support B comprises a base 15 having a pair of upstanding lugs 16 between which is pivoted at 17 a plate 18 having an upstanding sleeve 19 at each end. The sleeves 19 form supporting members for a saddle 20 which is provided with depending screw-threaded rods 21 having adjusting sleeve nuts 22 thereon which fit over the sleeves 19 and rest on the top thereof. It will be readily understood that by adjusting the sleeve nuts 22 on the rods 21 any desired adjustment in the height of the saddle may be obtained. The saddle 20 comprises a channel 23 adapted to receive the rim of the brake flange plate E. Small bars 24 are secured to the ends of the channel 23 to prevent the flange from running off the support. Eyes 25 are formed adjacent the ends of the channel 23 to receive a hook 26 fixed on the end of a chain 27. The other end of the chain 27 is detachably secured to an upstanding arm 31 on a shaft 28 which is mounted between the side members 10 of the frame A. The shaft 28 is provided with a cam 32 which normally lies in a horizontal position beneath the lower end of the track C. As shown in Figure 1 the chain 27 is secured to the support B which causes the support to tilt to one side. When the support is in this position the arms 31 are substantially in vertical position.

Referring to Figure 6 of the drawings it will readily be seen that the saddle 20 is considerably higher from the ground than the lower edge of the brake flange plate E of the wheel when on the ground. This wheel is elevated to the proper position by means of the inclined track C which is formed of a wide channel member having a tread 34 and the flanges 35. The low end of this member is provided with lugs 36 adapted to seat in the sockets formed by the lugs 14 and T-member 11 to firmly secure the end of the inclined track in the frame A. The opposite end of the track is held elevated by means of a plate 37 having lugs 38 pivoted to the flanges 35 of the inclined track and its lower end resting against the member 11.

This device is interchangeable for use on either the right wheels or left wheels of a vehicle. The base 15 of the support B is provided on opposite adjacent corners with upstanding lugs 39 one of which is adapted to fit into a corresponding notch 13 in the frame A and with the flat sockets 40, one of which is adapted to receive the end of the flat strip 12 of the frame A thus rigidly securing the members together. Referring to Figure 2 of the drawings it will be seen that the frame A may be positioned on either side of the support B. One of the end members 11 of the frame A is cut away at 41 to allow the cam 32 to lie flat beneath the track until the support B has been moved to a vertical position as shown by the dotted lines which will cause the cam 32 to rotate and lift the channel member C out of the frame A in order to collapse or lower the channel member automatically when it is desired to remove a wheel or tire.

When the device is not in use the various elements are neatly nested together into a convenient and compact form by folding the plate 37 into the channel 35, placing the support B and the chain brace D in the channel and covering the members thus assembled with the frame A which is provided with stirrups 42 which engage the bayonet slots 43 in the channel flanges 35. The support B is also provided with a threaded pin 44 which passes through an opening 45 in the channel member 34 and on which a nut may be threaded to hold the device in locked position.

The operation of my device is as follows:

Referring to Figure 6 of the drawings the device is in the position to receive the wheel, which is shown as having mounted thereon a deflated tire. The wheel is driven up the inclined channel member C until the brake band plate enters the channel in the saddle 20 which is in the position shown by full lines. Further movement of the wheel causes the support B to assume an upright position indicated by dotted lines which carries the weight beyond the peak of the channel and transfers it to the saddle. As the support B assumes a vertical position, the pull on the chain 27 causes the arm 31 to rotate the shaft 28. The cam 32 which is fixed to the shaft 28 is also rotated to lift the end of the channel member out of the frame A thereby causing member C to automatically collapse. The chain 27 and the arm 31 in this position tend to prevent the member B from going too far in the opposite direction.

It should be noted that the arm 31 should be of a length slightly greater than the distance traveled by the support B in reaching a vertical position in order that the hook 26 may be readily disconnected from the eye 25.

With the channel member C collapsed, the hook 26 is disconnected and the three members A, C and D may be entirely removed leaving the wheel elevated on the support B with the tire approximately two inches from the ground. To remove the wheel from the device it is only necessary to move the vehicle slowly in the opposite direction from mounting on the device, which will cause the support B to rock on its fulcrum and lower the wheel.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. A lifting device for vehicle wheels comprising a rectangular frame, an inclined channel member supported in said frame, a wheel support pivotally secured to one corner of said frame, and a flexible brace connected between said support and said frame, substantially as set forth.

2. A lifting device for vehicle wheels comprising a rectangular frame, a collapsible inclined channel member supported in said frame, an adjustable wheel support detachably secured to one corner of said frame, said support comprising a base, a vertical frame pivoted at one end of said base, a saddle mounted above said second frame, and means between said base and saddle for adjusting said saddle to different elevations, substantially as set forth.

3. A lifting device for vehicle wheels comprising a rectangular frame, an inclined channel member for elevating said wheel, a support on said frame for said inclined channel member hinged thereto, an adjustable wheel supporting member positioned adjacent the high point of said channel member and adapted to lean towards said channel member, and yielding means attached to said supporting member and said frame for retarding the movement of said supporting member in the opposite direction, substantially as set forth.

4. A lifting device for vehicle wheels comprising a base, an inclined channel member positioned in said base, an adjustable support positioned at one end of said base adjacent the high point of said inclined channel member, and means connected between said base and the top of said support for holding said support tilted toward said inclined channel mmeber, and cam means in said base for automatically releasing and lowering said inclined channel member by said adjustable support and cam means, substantially as set forth.

5. An automobile jack comprising a base, a channel member mounted in said base having a supporting element at one end, a wheel support mounted at one corner of said base adjacent the high point of said channel member, and a chain connected near the top of said wheel support for holding the support tilted toward the inclined channel member end, and cam means in said base actuated by said chain for automatically lowering said inclined channel member when the support assumes a vertical position, substantially as set forth.

6. An automobile jack comprising a base, a channel member mounted in said base having a supporting element hinged at one end to hold said member in an inclined position, a wheel support positioned at one corner of said base adjacent the raised end of said channel member, and means for holding said wheel support in a position inclined toward said channel member, said means adapted to automatically lower said channel member as the supporting element assumes a vertical position, substantially as set forth.

7. A lifting device for vehicle wheels comprising a base, an inclined channel member positioned in said base, a support positioned at one end of said base adjacent the high point of said inclined channel member, a shaft mounted in said base and having a cam fixed thereon in contact with the under side of said inclined channel member, a link connecting said shaft to said support for actuating said cam as the support assumes a vertical position whereby said inclined channel member is collapsed, substantially as set forth.

8. A lifting device for vehicle wheels comprising a base, an inclined member positioned in said base, a wheel support positioned at one end of said base adjacent the raised end of said inclined channel member, a shaft mounted in said base adjacent the lower end of said inclined member, a cam on said shaft adapted to raise the lower end of said inclined member from said base to cause it to collapse, and means connected to said shaft and said wheel support for rotating said shaft as the wheel support moves to vertical position, substantially as set forth.

9. A lifting device for vehicle wheels comprising a base, an inclined channel member positioned in said base, a wheel support positioned at one end of said base adjacent the raised end of said inclined channel member, a shaft mounted in said base at the lower end of said channel member, a cam on said shaft adapted to raise the lower end of said channel member from said base to cause it to collapse, and means connected to said shaft from said wheel support for rotating said shaft as the wheel support moves to vertical position, said means serving to check said wheel support from traveling too far in the opposite direction, substantially as set forth.

10. A lifting device for vehicle wheels comprising a base, an inclined member positioned in said base, a wheel support positioned adjacent the top of said inclined member, and means on said base connected to and actuated by said wheel support for automatically collapsing said inclined member, substantially as set forth.

11. A lifting device for vehicle wheels comprising a base, an inclined member positioned in said base, a wheel support positioned adjacent the raised end of said inclined member, a shaft mounted in said base beneath the lower end of said inclined member, a cam fixed on said shaft upon rotation adapted to raise the lower end of said inclined member from said base whereby it is automatically lowered, and means connected between said wheel support and said shaft whereby upon movement of said support the shaft is rotated, substantially as set forth.

FRANK F. WELLER.